(12) United States Patent
Hauber et al.

(10) Patent No.: US 9,068,586 B2
(45) Date of Patent: *Jun. 30, 2015

(54) METHOD FOR FORMING A SEAL BETWEEN A FASTENER AND ASSOCIATED SHEATHING BOARD

(71) Applicant: CertainTeed Gypsum, Inc., Tampa, FL (US)

(72) Inventors: Robert J. Hauber, Land O Lakes, FL (US); Michael P. Fahey, St. Petersburg, FL (US); Mark E. Hennis, Clearwater, FL (US)

(73) Assignee: CertainTeed Gypsum, Inc., Tampa, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/485,459

(22) Filed: Sep. 12, 2014

(65) Prior Publication Data

US 2014/0373336 A1 Dec. 25, 2014

Related U.S. Application Data

(60) Continuation of application No. 13/741,622, filed on Jan. 15, 2013, now Pat. No. 8,832,923, which is a continuation of application No. 12/567,857, filed on Sep. 28, 2009, now Pat. No. 8,353,401, which is a division of application No. 11/454,149, filed on Jun. 15, 2006, now Pat. No. 7,594,456.

(51) Int. Cl.
*F16B 39/02* (2006.01)
*F16B 39/22* (2006.01)
*B65D 73/02* (2006.01)
*F16B 27/00* (2006.01)
*B65D 85/20* (2006.01)

(52) U.S. Cl.
CPC ......... *F16B 39/025* (2013.01); *Y10T 29/49952* (2015.01); *Y10T 29/49964* (2015.01); *Y10T 29/4997* (2015.01); *F16B 39/225* (2013.01); *B65D 73/02* (2013.01); *F16B 27/00* (2013.01); *B65D 85/20* (2013.01)

(58) Field of Classification Search
CPC ...... F16B 39/025; F16B 39/22; F16B 39/225; F16B 27/00; F16B 29/00; F16B 33/004; F16B 43/001; B65D 85/20; Y10T 29/49952; Y10T 29/49964; Y10T 29/49997
USPC ................... 29/525.04, 525.15; 81/430, 434; 206/341, 343, 346, 347; 411/442, 443, 411/487, 489; 277/628, 650
See application file for complete search history.

(56) References Cited

U.S. PATENT DOCUMENTS 1,979,470 A * 11/1934 Johnston ........................ 156/182
2,203,294 A * 6/1940 Engle ............................. 411/487
2,439,516 A    4/1948 Holcomb (Continued)

*Primary Examiner* — Christopher M Koehler
(74) *Attorney, Agent, or Firm* — GrayRobinson, P.A.; Michael J. Colitz, III

(57) ABSTRACT

Disclosed is a fastening system and method for securing a sheathing board to an associated framing member. The system includes a feedband for retaining a series of fasteners and a powered drill for sequentially driving the fasteners. The feedband is made from a membrane of a polymeric compound. As the fastener is driven into the sheathing board, a portion of the membrane tears away from the surrounding feedband and becomes seated beneath the fastener. This acts to seal the penetration point and prevent water intrusion and otherwise prevents deterioration of the sheathing board.

8 Claims, 4 Drawing Sheets

(56) References Cited

U.S. PATENT DOCUMENTS

| | | | |
|---|---|---|---|
| 2,981,651 A * | 4/1961 | Arnold | 411/542 |
| 3,211,284 A | 10/1965 | Anstett | |
| 3,299,766 A | 1/1967 | Gould et al. | |
| 3,904,032 A | 9/1975 | Maier | |
| 3,955,674 A | 5/1976 | Maier et al. | |
| 3,994,200 A | 11/1976 | Swanson | |
| 4,019,631 A * | 4/1977 | Lejdegard et al. | 206/347 |
| 4,667,545 A | 5/1987 | Gould et al. | |
| 4,862,664 A * | 9/1989 | Romine | 52/410 |
| 5,443,345 A | 8/1995 | Gupta | |
| 5,542,323 A * | 8/1996 | Habermehl et al. | 81/434 |
| 5,921,736 A | 7/1999 | Habermehl | |
| 5,974,918 A * | 11/1999 | Nakagawa et al. | 81/434 |
| 6,010,291 A * | 1/2000 | Schwingle | 411/442 |
| 6,036,013 A | 3/2000 | Chen | |
| 6,811,366 B2 | 11/2004 | Chen | |
| 7,032,482 B1 | 4/2006 | Hoffman | |
| 7,594,456 B2 * | 9/2009 | Hauber et al. | 81/434 |
| 7,996,975 B1 * | 8/2011 | Denslow | 29/419.1 |
| 2003/0092784 A1 | 5/2003 | Tagge et al. | |
| 2003/0102236 A1 | 6/2003 | Wei | |
| 2005/0159057 A1 * | 7/2005 | Hauber et al. | 442/42 |
| 2010/0051490 A1 * | 3/2010 | Shinjo | 206/347 |

* cited by examiner

FIG. 3
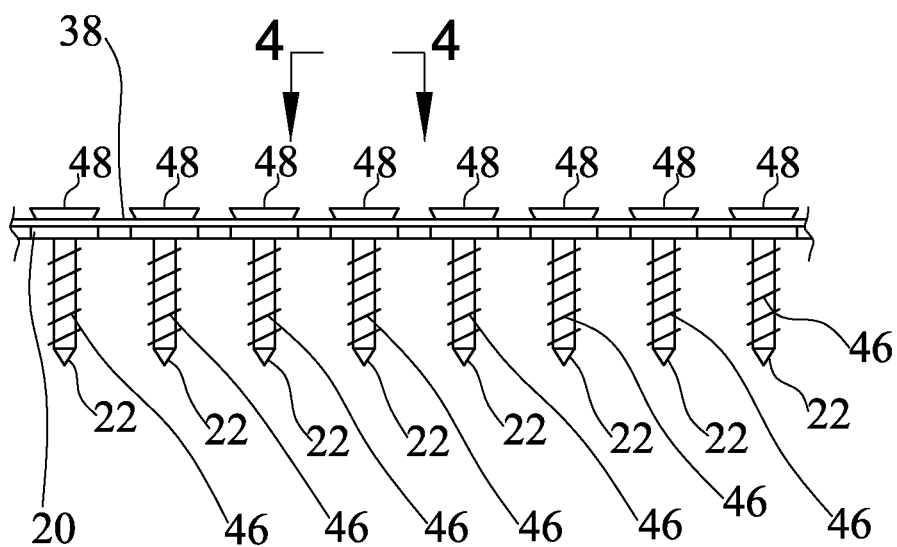
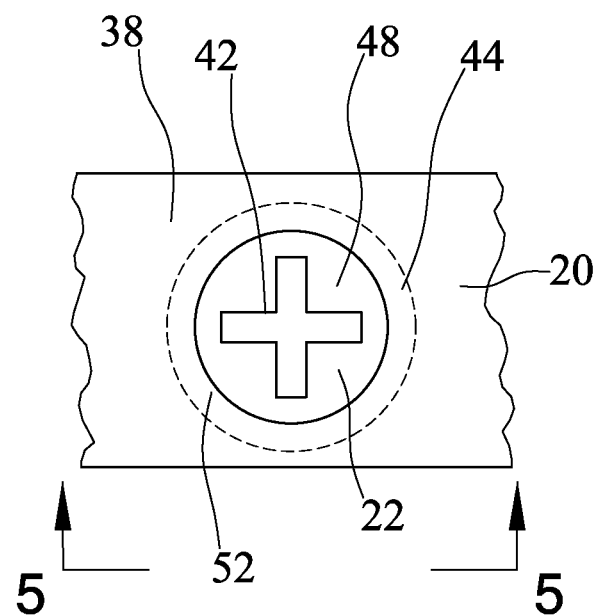
FIG. 4

METHOD FOR FORMING A SEAL BETWEEN A FASTENER AND ASSOCIATED SHEATHING BOARD

RELATED APPLICATION DATA

This application claims priority to and is a continuation of application Ser. No. 13/741,622 filed on Jan. 15, 2013, now U.S. Pat. No. 8,832,923, issued Sep. 16, 2014, and entitled "Fastening System for Sheathing Board," which is a continuation of application Ser. No. 12/567,857 filed on Sep. 28, 2009, now U.S. Pat. No. 8,353,401, issued Jan. 15, 2013, and entitled "Fastening System for Sheathing Board," which is a divisional of application Ser. No. 11/454,149 filed on Jun. 15, 2006, now U.S. Pat. No. 7,594,456, issued Sep. 29, 2009, and entitled "Fastening System for Sheathing Board."

BACKGROUND OF THE INVENTION

1. Field of the Invention

The present invention relates to a fastening system for sheathing board. More particularly, the present invention relates to a fastening system that creates a seal between a fastener and an associated sheathing board to thereby prevent water intrusion and deterioration at the point of penetration.

2. Description of the Background Art

Sheathing board is a commonly employed building material and is used to create finished surfaces within homes and office buildings. These boards are nailed, screwed or otherwise secured by a fastener into the wood or steel framing members of a building. The walls created by sheathing boards are often load bearing, carrying the weight from other structural components or from external forces, such as wind, rain or snow. This can contribute to increased pulling loads applied to the fasteners. Because sheathing board is extensively used within buildings, there is a need for improving the speed at which these boards can be installed. At the same time, the speed and ease of installation must not compromise the integrity and safety of the resulting structure.

Complicating matters further is the fact that sheathing board is often formed from gypsum and therefore subject to the detrimental effects of water. Although new gypsum compounds have been developed in an effort to lessen problems associated with water, the predominate make up of gypsum board is nevertheless gypsum and gypsum cannot be manufactured so as to be completely water resistant. Water intrusion into sheathing board is inherently problematic and can occur in the area around the fastener, which is called the penetration point. This water intrusion can cause a failure in the area around the fastener and a failure of the applied holding strength of the fasteners over the sheathing. This, in turn, can result in gypsum sheathing falling from its points of wall attachment and ultimately the complete failure of the board. These failures can be catastrophic.

One limited solution to preventing water intrusion is the use of caulk around the penetration point. In fact, for a number of different finishing systems, there can be locally or nationally required building codes which require that fastener heads be sealed with water resistant caulk or tape. In some cases, building felts or raps are used to cover the entire exposed surface of the sheathing to act as a protective barrier. However, these prior systems tend to contract and/or expand and thereafter break down after long term exposure to ultra violet (UV) radiation and/or temperature variations. The instability of these prior systems in such environments means that they are not an ideal solution. Furthermore, all of these systems are labor intensive and greatly increase the time required for sheathing board installation. Due to the inhibiting cost disadvantage of these systems, if they are not required by local building codes, they are usually not employed. Thus, there exists a need in the art for water and weather resistant fasteners that can be quickly and easily installed.

One known means of increasing the speed with which fasteners are driven is nailing strips. These strips are used to retain a series of fasteners, such as nails or screws. The strips enable a user to sequentially drive the fasteners, and in the process sever them from the strip, via an automated nailing machine or a powered drill. An example of a nailing strip is disclosed in U.S. Pat. No. 3,211,284 to Anstett. Anstett '284 discloses a nailing strip formed from a synthetic plastic material. A portion of the nailing strip is designed to break away once a nail is driven. This portion of the strip then acts as a weather tight seal for the head of the nail.

Similarly, U.S. Pat. No. 6,036,013 to Chen discloses a screw feed belt which holds a number of screws in an elongated strap. Connecting ribs are used to secure the individual screws. These ribs break upon the axial rotation of the screw and further permit the positioning of an associated positioning ring. The positioning ring includes a central opening that receives the shank of an associated screw.

The use of water tight seals in conjunction with mechanical fasteners is also known in the art. For example, U.S. Pat. No. 2,439,516 to Holcomb discloses a washer with a disc like body that is adapted to be secured about the outer portion of a shank. The washer is formed from a rubber or a rubber-like substance and forms a seal about an associated opening to prevent the entrance of water. The washer is resilient and when under compression it completely fills the space between the head of the fastener and an underlying plate or sheet.

Although each of the above referenced inventions achieves its individual objective, they all suffer from a common drawbacks. Namely, none of the aforementioned inventions are specifically for use in installing sheathing board and none of the background inventions provide a system for quickly installing a series of fasteners in a completely water and/or weather resistant manner.

SUMMARY OF THE INVENTION

It is therefore one of the objectives of this invention to provide a fastening system for securing a sheathing board to a framing member.

It is also an object of this invention to provide a series of sealing membranes and associated fasteners that can be driven into a sheathing board by way of a feeding band and a powered drill.

Still another object of this invention is to provide a fastening system wherein a chemical bond is created between a sealing membrane and the polymeric compound of an adjacent sheathing board, to thereby eliminate water intrusion and deterioration.

These and other objectives are realized in a fastening system for use in securing gypsum sheathing board to an underlying framing member. The invention finds particular application with gypsum board that includes a protective face coating and an underlying polymeric compound. The system includes a feedband comprising a series of interconnected membranes, with each membrane defined by a central extent and a peripheral crimped edge. Each membrane, is preferably formed from a polymeric compound consisting essentially of a thermal setting acrylic polymer, a butyl rubber and a softening agent. During the seating of a fastener within the sheathing board, a chemical bond is formed between the membrane and the underlying polymeric compound of the adjacent gypsum board. This chemical bond is created after the membrane becomes heated as it is driven into the sheathing board.

The system also includes a series of fasteners, with each fastener having a head and a threaded body. The body of each fastener is secured through the central extent of an associated membrane such that the head and membrane are in contact. An outer membrane area is defined by the space between the head and the peripheral crimped edge. This outer membrane area is forced upwardly around the head of the fastener when the fastener is driven into the gypsum board. The system further includes a powered drill that includes a feedband delivery mechanism, a chuck and a trigger. The trigger is used to selectively rotate the chuck. The delivery mechanism is used in retaining and selectively advancing the feedband such that the individual heads of the series of fasteners are sequentially delivered to the chuck and thereby enable the individual fasteners to be drilled into the gypsum board.

Thus, when an individual fastener is drilled it causes the crimped edge of the associated membrane to tear away from the feedband. The application of additional rotational force by the drill causes the membrane to become heated to thereby facilitate the chemical bond between the membrane and the underlying polymeric compound.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 3 is a side elevational view taken along line 3-3 of FIG. 2.

FIG. 4 is a detailed top plan view taken along line 4-4 of FIG. 3.

Similar reference characters refer to similar parts throughout the several views of the drawings.

DETAILED DESCRIPTION OF THE PREFERRED EMBODIMENT

The present invention relates to a fastening system that is adapted for securing a sheathing board to an associated framing member. The system includes a feedband for retaining a series of fasteners and a powered drill for sequentially driving the fasteners. The feedband is made from a membrane of a polymeric compound. As the fastener is driven into the sheathing board, a portion of the membrane tears away from the surrounding feedband and becomes seated beneath the fastener. This acts to seal the penetration point and prevent water intrusion and otherwise prevents deterioration of the sheathing board. The various details of the present invention are described in greater detail hereinafter in conjunction with FIGS. 1-8.

Figure 1:
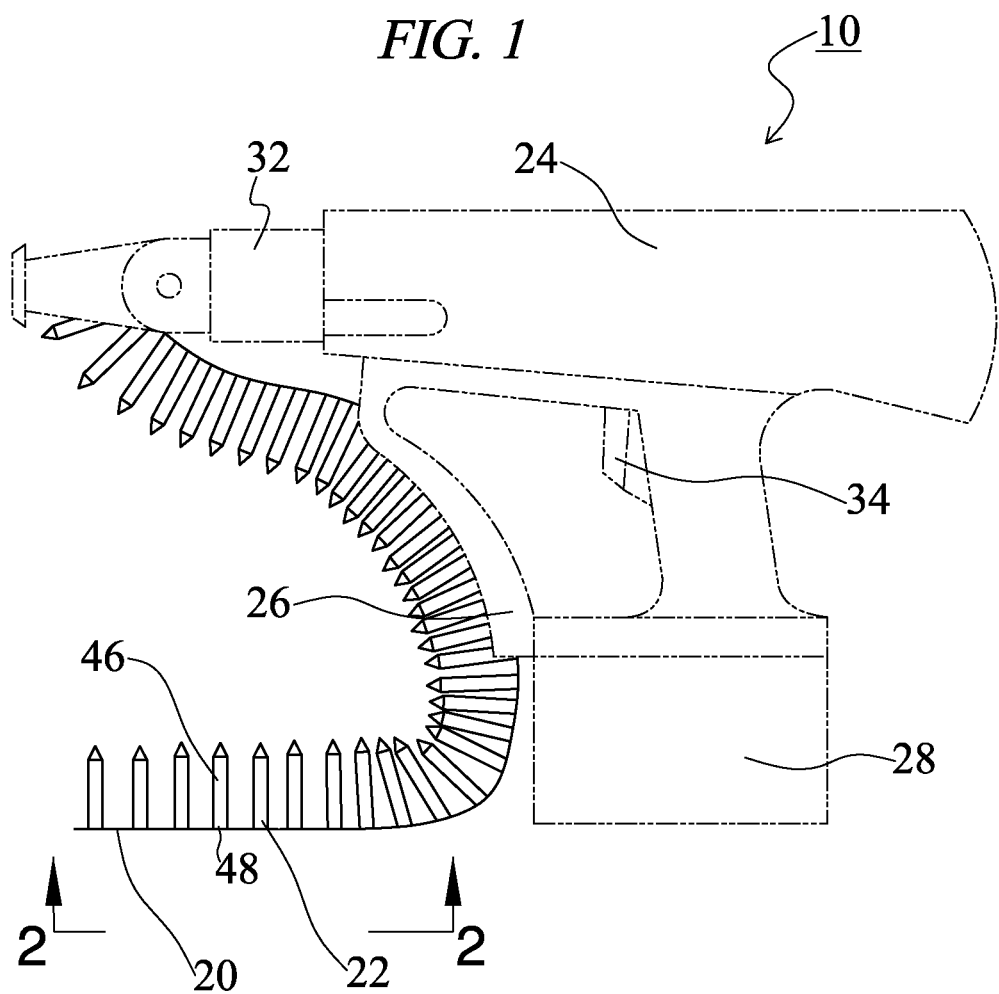
FIG. 1 is a side elevational view of the fastening system of the present invention.

Turning now to FIG. 1, the system 10 of the present invention is depicted. As illustrated, system 10 includes a feedband 20 (which retains a series of fasteners 22) and a powered drill 24. Drill 24, in turn, includes a feedband delivery mechanism 26 for retaining and sequentially advancing feedband 20. Drill 24 is of a conventional design and can be an air gun that is powered either by a battery 28 or by an adjacent outlet via a power cord (not shown). As is also conventional, drill 24 includes a chuck 32 for retaining and driving an individual fastener 22. Chuck 32 can be formed from three jaws that are selectively moved either inwardly or outwardly, via a key, to engage a head of fastener 22. Drill 24 further includes a trigger 34 for allowing a user to selectively deliver rotational power to chuck 32.

The feed band delivery mechanism 26 is included along the forward end of drill 24. This delivery mechanism 26 includes a channel that retains feedband 20. Mechanism 26 additionally includes a motor (not shown) for incrementally advancing feedband 20 within the channel in a direction towards chuck 32. Thus, delivery mechanism 26 sequentially supplies the fasteners 22 to the drill chuck 32 so that they can be repeatedly and quickly driven by a user through the sheathing board 36 and into an underlying wood or steel framing member. A drill that meets of requirements of the present invention is sold by DuraSpin Products LLC of Cincinnati, Ohio under the trademark DuraSpin™.

Figure 2:
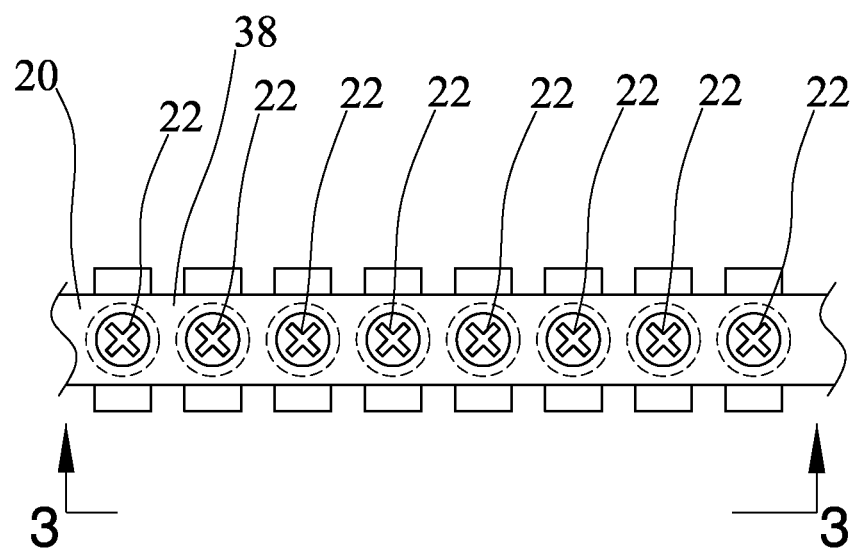
FIG. 2 is a detailed view taken along line 2-2 of FIG. 1.
Figure 5:
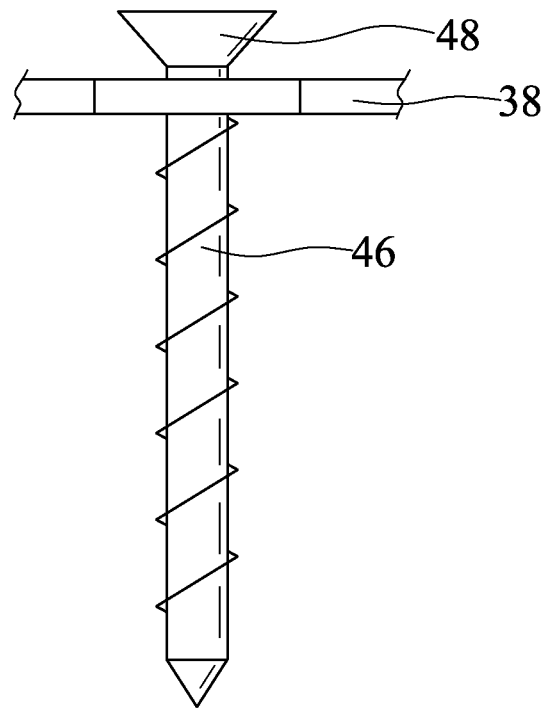
FIG. 5 is a side elevational view taken along line 5-5 of FIG. 4.
Figure 6:
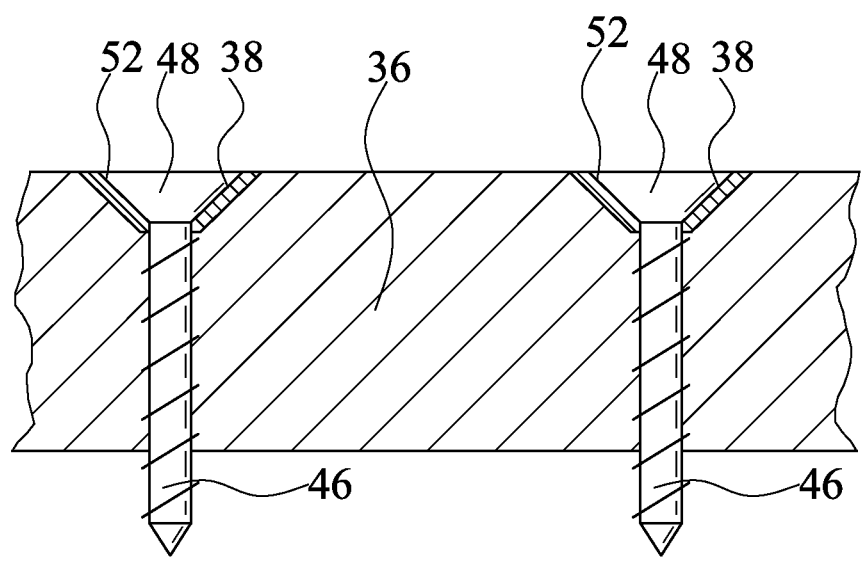
FIG. 6 is a partial cross sectional view showing two fasteners secured within a sheathing board.
Figure 7:
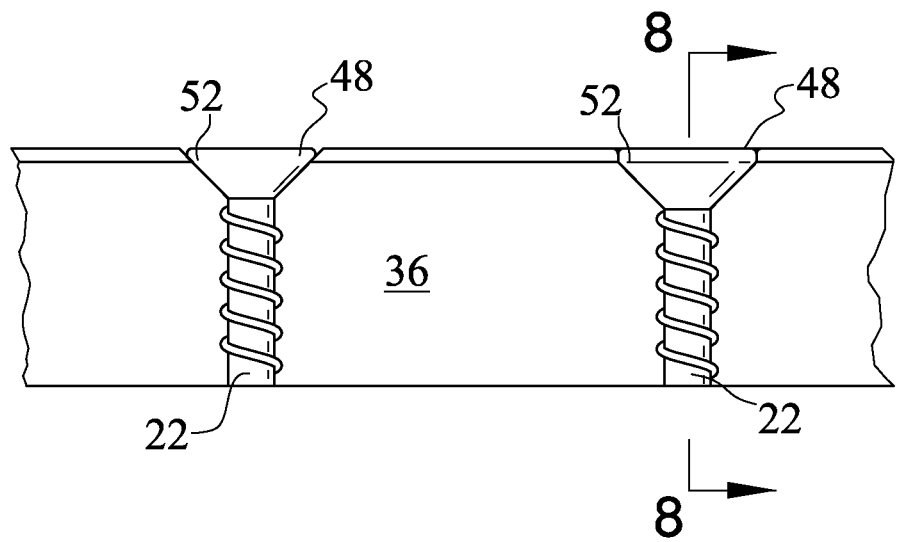
FIG. 7 is an additional partial cross sectional view showing two fasteners secured within a sheathing board.
Figure 8:
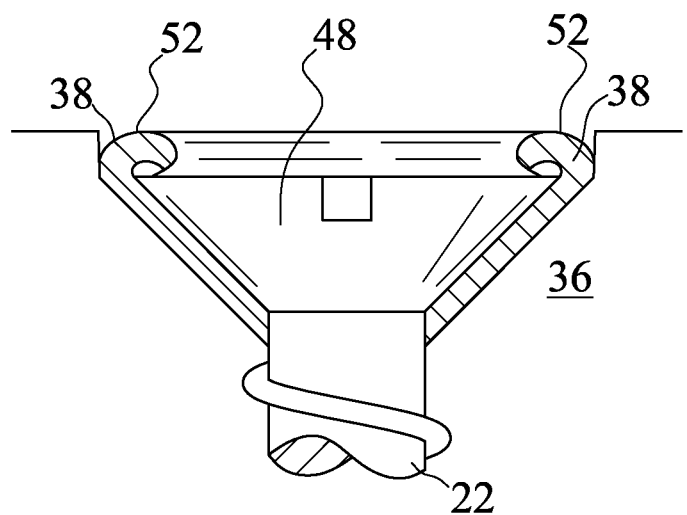
FIG. 8 is a partial cross sectional view taken along ling 8-8 of FIG. 7.

FIG. 2 is a detailed view of the feedband 20 of the present invention. Feedband 20 includes a series of interconnected membranes 38 that together form an elongated strip. The number of fasteners 22 will dictate the overall length of feedband 20. Membranes 38 are each defined by a central extent 42 and a peripheral, crimped, circular edge 44 (FIG. 4). As noted in FIG. 3, each individual membrane 38 is pre-fit around the shaft 46 but beneath the head 48 of a fastener 22. Thus, the number of fasteners 22 retained within a feedband 20 corresponds to the number of membranes 38.

Crimped edge 44 allows both the membrane 38 and its associated fastener 22 to be torn away from the surrounding feedband 20 as fastener 22 is driven into sheathing board 36. This tearing is achieved by crimped edge 44, which is frangible relative to the surrounding feedband 20 and ruptures upon application of axial or radial forces. Although this edge 44 is described as being crimped, those skilled in the art will appreciate that a perforated or a partially punctured periphery will also achieve these same objectives.

In the preferred embodiment, both the feedband 20 and the individual membranes 38 are integrally formed from a polymeric compound. A preferred compound consists essentially of a thermal setting acrylic polymer, a butyl rubber and a softening agent. The acrylic polymer is included due to its good ultraviolet (UV) resistance and because it allows the compound to cure into a dimensionally stable compound. The use of other thermal setting plastic polymers, or combinations of such polymers, is within the scope of the present invention. The butyl rubber is included as a cheap and effective means of providing durability. Finally, the softening agent gives the compound a suitable degree of elasticity. Such softening agents keep the polymer pliable until such time as oxidation agents allow it to cure and harden.

It has been found that the preferred polymeric compound can chemically bond with a polymeric compound found under the protective face coating of some gypsum sheathing boards. The compound may also bond with a protective face coating of the board. Namely, after the polymer of the membrane 38 has become heated from the forces applied by drill 24, the membrane 38 is then seated within the sheathing board 36 as noted in FIG. 6. In this orientation the polymer of the membrane 38 is in direct contact with any polymers present within the interior of sheathing board 36. This contact allows the two polymers to form a chemical bond and thereby seal the penetration point. Once this bond is created, the softening agents within the polymers oxidize whereby the bonded polymers harden and lose their elastomeric properties. It has been found that the seal created by this chemical bond advantageously repels water and prevents the deterioration of gypsum board 36.

Although the above described polymeric compound for the membrane has been described as being preferred, those skilled in the art will realize that other polymeric compounds can be used to achieve the objectives of the present invention. For instance, a silicone can be used in place of the butyl rubber. While this may increase the price of the compound, no other adverse effects will be realized. Likewise, it is also within the scope of the present invention to form the feedband from a commercially available polymeric material. One suitable composition is made by Bakor Company of Mississauga, Ontario under the trademark Blueskin™. This composition is desirable due to its zero water vapor permeance and its ability to resist up to 9.1 lbs/sq inch of water. The manner in which the polymeric compound of the membrane acts in forming a seal will be described in greater detail hereinafter.

With reference now to FIGS. 2 and 3, the manner in which the feedband is employed in retaining a series of fasteners is depicted. Specifically, each fastener 22 preferably includes a head 48 and a threaded body 46. However, feedband 20 can be adapted to retain non-threaded fasteners, such as nails. The body of each fastener 22 is secured through a central extent 42 of an associated membrane 38. To achieve this, each membrane 38 has a slotted central extent 42 which receives the body 46 of the threaded fastener 22. Fasteners 22 are thereafter positioned within the feedband such that the head 48 and the surface of feedband 20 are in direct contact with one another.

With specific reference to FIG. 4, it will be noted that the area defined by the peripheral crimped edge 44 of each membrane 38 is larger than the head 48 of the associated fastener 22. Specifically, the area between the head 48 and the crimped edge 44 is defined as an outer membrane area 52. As noted above, driving a fastener 22 with the drill 24 will cause the membrane 38 to detach from the surrounding feedband 20. Thereafter, driving the fastener 22 further into the sheathing board 36 will cause the outer membrane area 52 to mushroom up about the majority of the periphery of the countersunk fastener head 22. In other words, the excess material of the outer membrane area 52 will be directed upwardly as the head 48 of the fastener 22 is driven into the sheathing board 36. This excess material surrounds and seals the peripheral area of the fastener, which is the penetration point for the sheathing board, and yields increased surface water resistance. This mushroom effect is illustrated by the partial cross sectional view of FIG. 6.

Thus, in use, the delivery mechanism 26 of the drill 24 delivers an individual fastener 22 into the drill's chuck 32. Thereafter, engaging the trigger 34 causes the chuck 32 to rotate and thereby drives the fastener 22 into the sheathing member 36. Ideally, the head 48 of the fastener 22 is securely seated and countersunk into the sheathing board 36 to avoid any out pouching at the fastener point. The result is a flat sheathing board surface that allows any number of exterior finishing systems to be applied.

Although the present invention can be used in conjunction with a variety of sheathing members 36, it is particularly applicable to sheathing members with a protective face coating and an underlying polymeric compound. One example of such a sheathing member is made by BPB North America Inc. under the trade name GlassRoc®. In accordance with the present invention, drilling an individual fastener 22 causes the crimped edge 44 of the associated membrane 38 to tear away from the feedband 26 and allows the membrane to seat within the sheathing member. Because the membrane 38 is elastic it becomes compressed under the pressure of the fastener 22. When an additional rotational force is applied to the fastener 22, the membrane 38 becomes heated. This heating of the membrane acts as a cure activator and facilitates a chemical bond between the membrane 38 and the underlying polymeric compound of the sheathing board 36. This bond is beneficial insomuch as it prevents water intrusion at the point of penetration and cures to form a hardened compound which is resistant to UV rays.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A method of sequentially driving a series of fasteners into a sheathing member with a power tool, the sheathing member including a first polymeric material, the series of fasteners being initially retained in a feedband, the feedband including a number of interconnected membranes, with each membrane securing an associated fastener, the membranes comprising a second polymeric material, the method comprising:
   advancing the feedband such that a selected fastener can be driven by the power tool;
   rotating the selected fastener by way of the power tool such that it is driven into the sheathing member, the rotation of the selected fastener causing the associated membrane to dislodge from the feedband;
   seating the dislodged membrane within the sheathing member and beneath the selected fastener via continued rotation by the power tool;
   frictionally heating the dislodged membrane to render it dimensionally unstable and thereby cause the first polymeric material and second polymeric material to chemically bond.

2. The method as described in claim 1 comprising the further step of forcing an outer area of the membrane upwardly around a head of the fastener when the fastener is driven into the sheathing member.

3. The method as described in claim 1 wherein the fastener is a threaded fastener.

4. The method as described in claim 1 wherein the chemical bond is formed by heating both the first and the second polymeric material.

5. The method as described in claim 1 wherein the second polymeric material of the feedband includes a thermal setting polymer.

6. The method as described in claim 1 wherein the second polymeric material of the feedband includes a butyl rubber.

7. The method as described in claim 1 wherein the second polymeric material of the feedband includes a softening agent.

8. A method of forming a water tight seal about a fastener, the method comprising the following steps:
- providing a building board comprising a first polymeric material;
- providing a feedband comprising a number of interconnected membranes, with each membrane securing an associated fastener, the membranes comprising a second polymeric material;
- providing a power tool;
- advancing the feedband such that a selected fastener can be driven by the power tool;
- rotating the selected fastener by way of the power tool such that it is driven into the building board, the rotation of the selected fastener causing the associated membrane to dislodge from the feedband;
- frictionally heating the dislodged membrane to thereby cause the first polymeric material and second polymeric material to chemically bond and form the water tight seal.

* * * * *